(12) United States Patent
Qian (10) Patent No.: US 7,639,873 B2
(45) Date of Patent: Dec. 29, 2009

(54) ROBUST SHOT DETECTION IN A VIDEO

(75) Inventor: Richard J. Qian, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 11/192,216

(22) Filed: Jul. 28, 2005

(65) Prior Publication Data

US 2007/0025614 A1    Feb. 1, 2007

(51) Int. Cl.
G06K 9/00 (2006.01)
H04N 5/14 (2006.01)

(52) U.S. Cl. .................................. 382/168; 348/700
(58) Field of Classification Search ............... 348/700
See application file for complete search history.

(56) References Cited

U.S. PATENT DOCUMENTS

| | | | |
|---|---|---|---|
| 5,513,306 A | 4/1996 | Mills et al. | |
| 5,706,417 A | 1/1998 | Adelson | |
| 5,764,921 A * | 6/1998 | Banham et al. | 709/247 |
| 5,929,867 A | 7/1999 | Herbstman et al. | |
| 5,990,980 A * | 11/1999 | Golin | 348/700 |
| 6,006,234 A | 12/1999 | Govindarajan et al. | |
| 6,026,182 A | 2/2000 | Lee et al. | |
| 6,028,603 A | 2/2000 | Wang et al. | |
| 6,188,831 B1 | 2/2001 | Ichimura | |
| 6,204,840 B1 | 3/2001 | Petelycky et al. | |
| 6,351,765 B1 | 2/2002 | Pietropaolo et al. | |
| 6,400,996 B1 | 6/2002 | Hoffberg et al. | |
| 6,469,711 B2 | 10/2002 | Foreman et al. | |
| 6,476,826 B1 | 11/2002 | Plotkin et al. | |
| 6,606,409 B2 * | 8/2003 | Warnick et al. | 382/173 |
| 6,721,361 B1 | 4/2004 | Covell et al. | |
| 6,724,933 B1 | 4/2004 | Lin et al. | |
| 6,741,996 B1 | 5/2004 | Brechner et al. | |
| 6,782,049 B1 * | 8/2004 | Dufaux et al. | 375/240.01 |
| 6,928,613 B1 | 8/2005 | Ishii et al. | |
| 7,027,509 B2 * | 4/2006 | Jun et al. | 375/240.16 |

(Continued)

FOREIGN PATENT DOCUMENTS

WO    WO 01/28222    4/2001

(Continued)

OTHER PUBLICATIONS

Overmeire et al., "Constant quality video coding using video content analysis", available online Feb. 19, 2005 pp. 343-369.*

(Continued)

*Primary Examiner*—Vikkram Bali
*Assistant Examiner*—Soo Jin Park
(74) *Attorney, Agent, or Firm*—Senniger Powers LLP (57) ABSTRACT

Automatic detection of one or more segment boundaries in a video. An analysis window identifies a selected series of video frames of the video to analyze for segment boundaries. A property value is determined for each of the video frames in the series of video frames. A maximum difference of the differences of property values between adjacent frames is compared to a threshold median value and a ratio of the maximum difference to a determined mean of the differences of property values between adjacent frames is compared to an adaptive threshold value. A segment boundary is defined as a function of the comparisons.

18 Claims, 5 Drawing Sheets

U.S. PATENT DOCUMENTS

| | | |
|---|---|---|
| 7,124,366 B2 | 10/2006 | Foreman et al. |
| 7,152,209 B2 * | 12/2006 | Jojic et al. ................. 715/720 |
| 7,203,380 B2 | 4/2007 | Chiu et al. |
| 7,222,300 B2 | 5/2007 | Toyama et al. |
| 7,251,413 B2 * | 7/2007 | Dow et al. ..................... 386/46 |
| 7,359,440 B2 * | 4/2008 | Zhang et al. ............ 375/240.16 |
| 7,372,991 B2 * | 5/2008 | Chen et al. .................. 382/173 |
| 7,398,004 B1 | 7/2008 | Maffezzoni et al. |
| 2001/0003468 A1 * | 6/2001 | Hampapur et al. .......... 348/700 |
| 2003/0032033 A1 | 2/2003 | Anglin et al. |
| 2003/0146915 A1 | 8/2003 | Brook et al. |
| 2003/0192049 A1 | 10/2003 | Schneider et al. |
| 2003/0227493 A1 | 12/2003 | Yokomizo |
| 2003/0237091 A1 | 12/2003 | Toyama et al. |
| 2004/0049419 A1 | 3/2004 | Knight |
| 2005/0033758 A1 | 2/2005 | Baxter |
| 2005/0071774 A1 | 3/2005 | Lipsky et al. |
| 2005/0114357 A1 | 5/2005 | Chengalvarayan et al. |
| 2005/0200762 A1 * | 9/2005 | Barletta et al. .............. 348/700 |
| 2005/0216454 A1 | 9/2005 | Diab et al. |
| 2005/0286863 A1 | 12/2005 | Howarth |
| 2007/0218448 A1 | 9/2007 | Harmeyer et al. |
| 2008/0034325 A1 | 2/2008 | Ording |

FOREIGN PATENT DOCUMENTS

| | | |
|---|---|---|
| WO | WO 03/023781 | 3/2003 |

OTHER PUBLICATIONS

Lienhart, Comparison of Automatic Shot Boundary Detection Algorithms, 1999, 12 pages, SPIE (The International Society for Optical Engineering). Bellingham, WA; SPIE, 1999, S., (vol. 2656-29).

Lienhart, Reliable Transition Detection in Videos: A Survey and Practitioner's Guide, International Journal of Image and Graphics (IJIG), 2001, 16 pages, vol. 1, No. 3.

Unknown, "Auto-Editing and Manual Editing with Windows Movie Maker 2", published Jan. 7, 2003, 3 pgs., http://www.microsoft.com/windowsxp/usin....

Unknown, "Creating Clips in Windows Movie Maker 2", updated Jan. 7, 2003, 1 pg., http://www.microsoft.com/windowsxp/usinp/moviemaker/learnm....

Unknown, "Trimming Audio and Video Clips with Windows Movie Maker 2", updated Jan. 7, 2003, 2 pgs., http://www.microsoft.com/windowsxp/usin....

Wikipedia, "Windows Movie Maker", http://en.wikipedia.org/wiki/Windows_Movie_Maker, saved printout pp. 1-18 on Feb. 28, 2008.

Microsoft, "Adding Video Effects to Your Movies with Windows Movie Maker 2", Nov. 13, 2003, http://www.microsoft.com/windowsxp/using/moviemaker/learnmore/addingeffects.mspx, printout pp. 1-3.

\* cited by examiner

FIG. 4

ROBUST SHOT DETECTION IN A VIDEO

BACKGROUND

An increasing number of people own and use camcorders to make videos that capture their experiences and document events in their lives. One of the primary problems with consumer home video acquisition devices such as camcorders is that they are linear-based devices and a single recording, either digital or on tape, may contain multiple "events" (e.g. birthday party, soccer game, vacation video, etc.). Each event may in turn consist of multiple "shots" (i.e. the sequence of contiguous video frames between the time when the camera is instructed to start recording and when it instructed to stop recording). Moreover, each shot may consist of one or more scenes. Unfortunately, the linear nature of typical video recordings often makes it difficult to find and play back a segment of the video showing a specific event, scene, or shot.

It is usually more convenient to the user if a long video can be divided into a number of shorter segments and the user is allowed to access those segments directly. Ideally the video should be divided at the points where natural discontinuities occurs. Natural discontinuities include discontinuities in time (e.g., gaps in the recorded DV time code) as well as discontinuities in content (e.g., scene changes). If the recording is continuous on a digital video (DV) tape, for example, the time code should increment by a predictable value from frame to frame. If the recording is not continuous, (e.g., the user stops the recording then records again later), then there will be a gap in the time code that is larger than the normal frame-to-frame increment. Such gaps correspond to discontinuity points in time. Similarly, if there is no sudden motion or lighting change, the video content would remain generally continuous as well. A sudden change in the video content may suggest the occurrence of some event in the video. Such sudden changes would correspond to discontinuity points in content. A time- or content-based discontinuity point in a video is sometimes referred to as a shot boundary, and the portion of a video between two consecutive shot boundaries is considered to be a shot.

Known video playback, browsing and editing applications, such as multimedia editing applications (MEAs), allow a user to bring versatility to such linear video recordings via a personal computer by allowing the user to capture or transfer the video onto the computer and then to manually segment the digital video file into events of the user's choosing. Some MEAs make this easier for the user by attempting to automatically detect shot boundaries within a particular video file. Thereafter, the MEA may segment the video file into shots that are displayed in a library to allow the user to manually select shots and combine them to form recordings of events of the user's choosing.

Conventional MEAs use various methods to detect shot boundaries within a particular video. Unfortunately, as known to those skilled in the art, these applications are unable to achieve the desired level of performance in both precision and recall for a wide range of videos.

SUMMARY

Embodiments of the present invention overcome one or more deficiencies in existing shot detection methods. For example, aspects of the invention examine not only the ratio between local maximum differences in content within an analysis window, but also how the local maximums as a group compare against a statistical profile of the window. Accordingly, if the ratio falls below a prescribed threshold but as a group the local maximums stands out, the algorithm may choose to declare a boundary by choosing the strongest among the group.

Computer-readable media having computer-executable instructions for segmenting videos embody further aspects of the invention. Alternatively, embodiments of the invention may comprise various other methods and apparatuses.

Other features will be in part apparent and in part pointed out hereinafter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
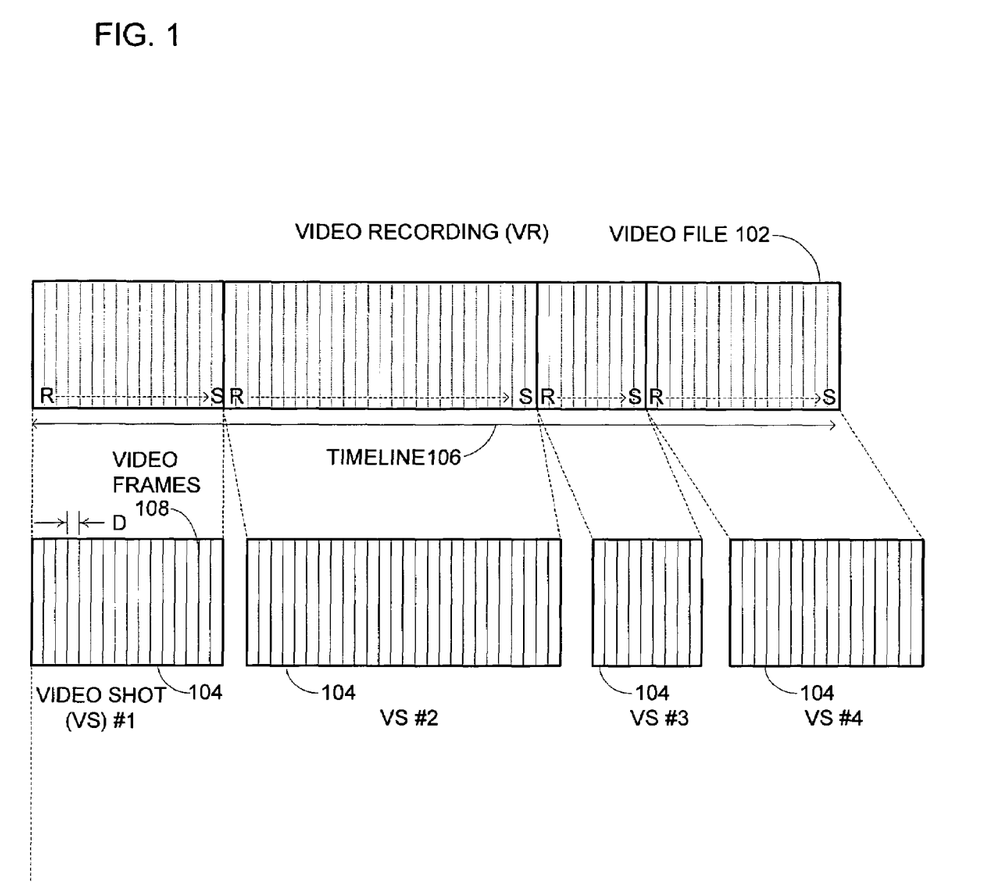
FIG. 1 is an exemplary block diagram illustrating levels of a digital video file.

Referring first to FIG. 1, an exemplary block diagram illustrates three fundamental levels of a digital video file 102 or a digital video library consisting of multiple video files 102. At a fundamental or base level, video file 102 comprises multiple video frames 108, each video frame 108 typically having a fixed duration D and a known date and time at which the recording began. As known to those skilled in the art, the duration of a video frame 108 is typically a small fraction of one second (e.g., 1/30, 1/25 or 1/24) but may be any other value or may vary from frame to frame within a single video file 102.

At the next higher level, digital video file 102 comprises multiple video segments, or shots, 104 including one or more video frames 108. As shown by timeline 106, each video shot 104 represents a continuously recorded portion of the digital video file 102 between a record operation R and a stop operation S of the recording device. Within video shot 104, each subsequent video frame 108 after the first video frame 108 in the shot has a start date and time equal to the start date and time of the previous video frame 108 plus the duration D of the previous video frame 108. As known to those skilled in the art, the difference between the last frame of one shot and the first frame of the next shot is always greater than the duration of a single video frame 108. It may be a few seconds or it may be several minutes, hours or even days or months away, typically corresponding to the time between the user pressing stop on a camcorder and the next time the user starts recording.

Figure 2:
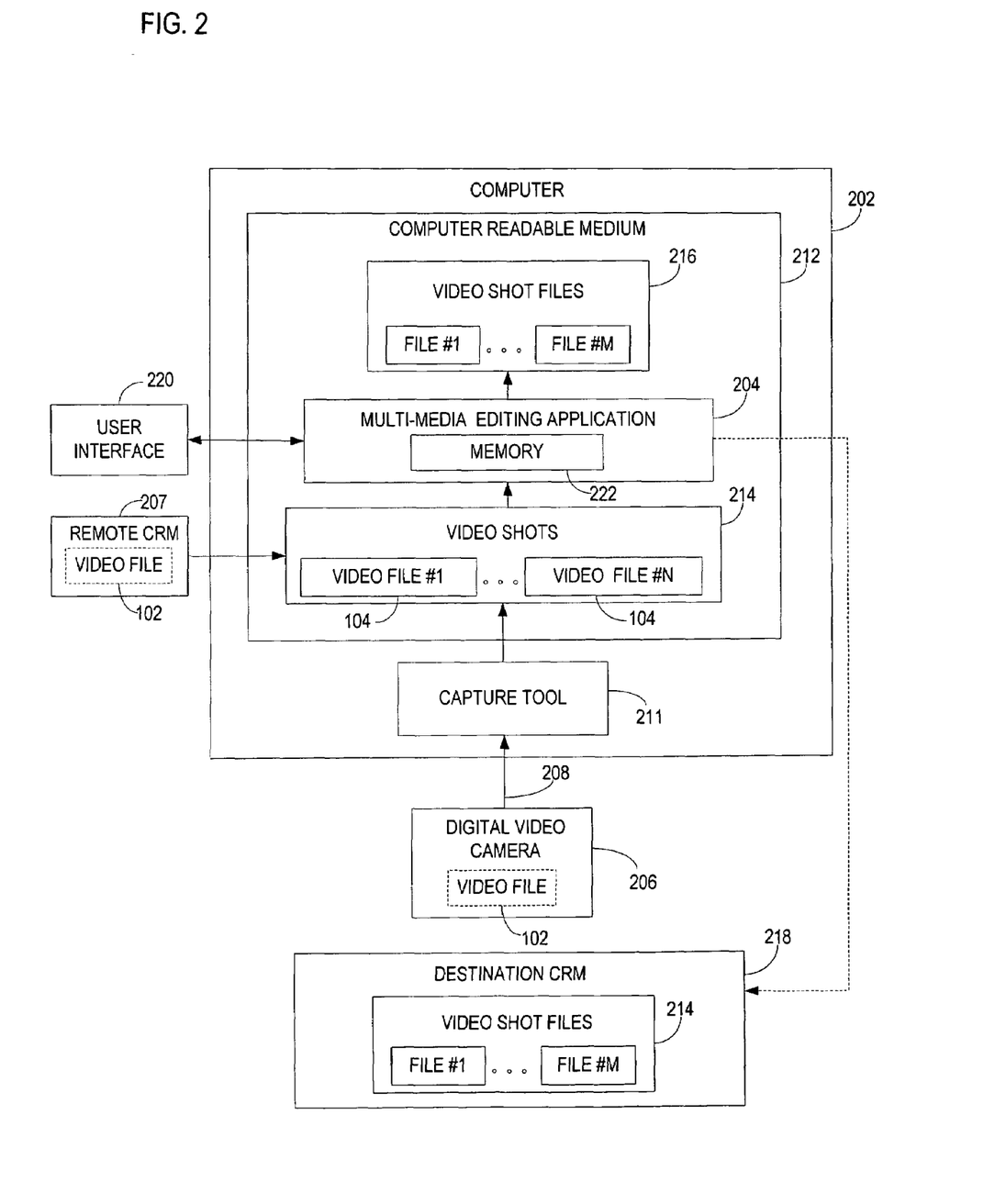
FIG. 2 is a block diagram illustrating one example of a suitable operating environment in which aspects of the invention may be implemented.

Referring now to FIG. 2, an exemplary block diagram illustrates a suitable operating environment in which aspects of the invention may be implemented. A computer 202 comprises a multimedia editing application (MEA) 204 for performing various video editing functions including identifying video shot or other segment boundaries between video shots 104 stored within one or more video files 214. A video source such as a digital video camera 206 or a remote computer-readable medium (CRM) 207 can provide the digital video file 102 containing video shots and/or other media elements (e.g., still shots). The MEA 204 organizes video frames 108 and video shots 104 and/or other media elements dynamically or statically for the purposes of display through a user interface 220 or for subsequent output onto another CRM such as a Digital Video (DV) tape linked to the computer 202. For example, the DV tape may be an optical video disc with chapters such as a DVD-video disc.

In one embodiment, the digital video camera 206 records a visual image or series of visual images and generates a digital video stream 208 representative of the visual image or series of visual images. The digital video stream 208 includes video data specifying the start time and date of the individual video images or "video frames" included in the video stream 208.

The remote CRM 207 can be any CRM storing video shots that can be linked to the computer 202 for the purpose of transferring or importing the stored video files to a CRM 212 of the computer 202. For example, the remote CRM 207 can be an optical disc in a DVD-drive, another computer, a personal video recorder (PVR), or any other video-capable device that can be linked to the computer 202 via a network (e.g. Ethernet) or direct connection (e.g. USB) such that video files 102 stored on the remote CRM 207 can be transferred to the computer 202 via electronic means such as file transfer or electronic mail.

A capture tool 211 is linked to the computer 202 and the digital video camera 206 for capturing the digital video stream 208. The capture tool 211 transfers the digital data directly to the CRM 212 (e.g., hard drive or random access memory (RAM)) of the computer 202 for storage as a video shot file 214 containing, for example, DV data. Alternatively, the capture tool 211 may convert the format of digital video stream 208 from one digital video format to another during capture. For example, the capture tool 211 may convert the format of the digital video stream 208 from DV data to Windows Media Video (WMV) while preserving the date and time information about each shot from the original video file 102. The capture tool 211 may change the timing or the number of frames present within the digital video stream 208. For example, the capture tool 211 may convert the frame rate of the digital video steam 208 to a different frame rate while preserving the start time for each new video frame 108 created and calculating a new duration for each video frame 108. The capture tool 211 may be implemented using software that writes DV-AVI files together with a direct connection such as an Institute of Electrical and Electronic Engineers (IEEE) 1394 interface. The IEEE-1394 interface can be connected to an IEEE-1394 connection port on a digital camcorder and connected to an IEEE-1394 connection port on the computer 202 to facilitate the transfer of the digital video stream 208, generated by digital video camera 206, to the computer 202 for storage.

An MEA 204 such as Windows® Movie Maker editing software offered by Microsoft Corporation allows a user to archive video recordings recorded on video tapes for storage in a digital format. The MEA 204 according to embodiments of the invention further allows a user to view a single tape, an entire library of video tapes, other video files, and/or still images as clusters. Thus, the user can locate a specific cluster, shot, frame, or other segment of video from the entire video file 102 or video library present on the computer 202 or the remote CRM 207.

The MEA 204 in the illustrated embodiment provides a user interface (UI) 220 for defining the number of video frames to analyze for the shot, or segment, boundary identification process. For example, the user has the option to use the UI 220 to define, and/or select, a specific number of video frames 108 to examine for a segment boundary. Alternatively, the user may elect to analyze a default number frames as defined in a memory 222 of the MEA application 204.

The exemplary operating environment illustrated in FIG. 2 includes a general purpose computing device (e.g., computing device 202) such as a computer executing computer-executable instructions. The computing device typically has at least some form of computer readable media (e.g., computer-readable medium 212). Computer readable media, which include both volatile and nonvolatile media, removable and non-removable media, may be any available medium that may be accessed by the general purpose computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The computing device includes or has access to computer storage media in the form of removable and/or non-removable, volatile and/or nonvolatile memory. A user may enter commands and information into the computing device through input devices or user interface selection devices such as a keyboard and a pointing device (e.g., a mouse, trackball, pen, or touch pad). Other input devices (not shown) may be connected to the computing device. The computing device may operate in a networked environment using logical connections to one or more remote computers.

Although described in connection with an exemplary computing system environment, aspects of the invention are operational with numerous other general purpose or special purpose computing system environments or configurations. The computing system environment is not intended to suggest any limitation as to the scope of use or functionality of aspects of the invention. Moreover, the computing system environment should not be interpreted as having any dependency or requirement relating to any one or combination of components illustrated in the exemplary operating environment. Examples of well known computing systems, environments, and/or configurations that may be suitable for use in embodiments of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the invention may be described in the general context of computer-executable instructions, such as program modules, executed by one or more computers or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

Figure 3A:
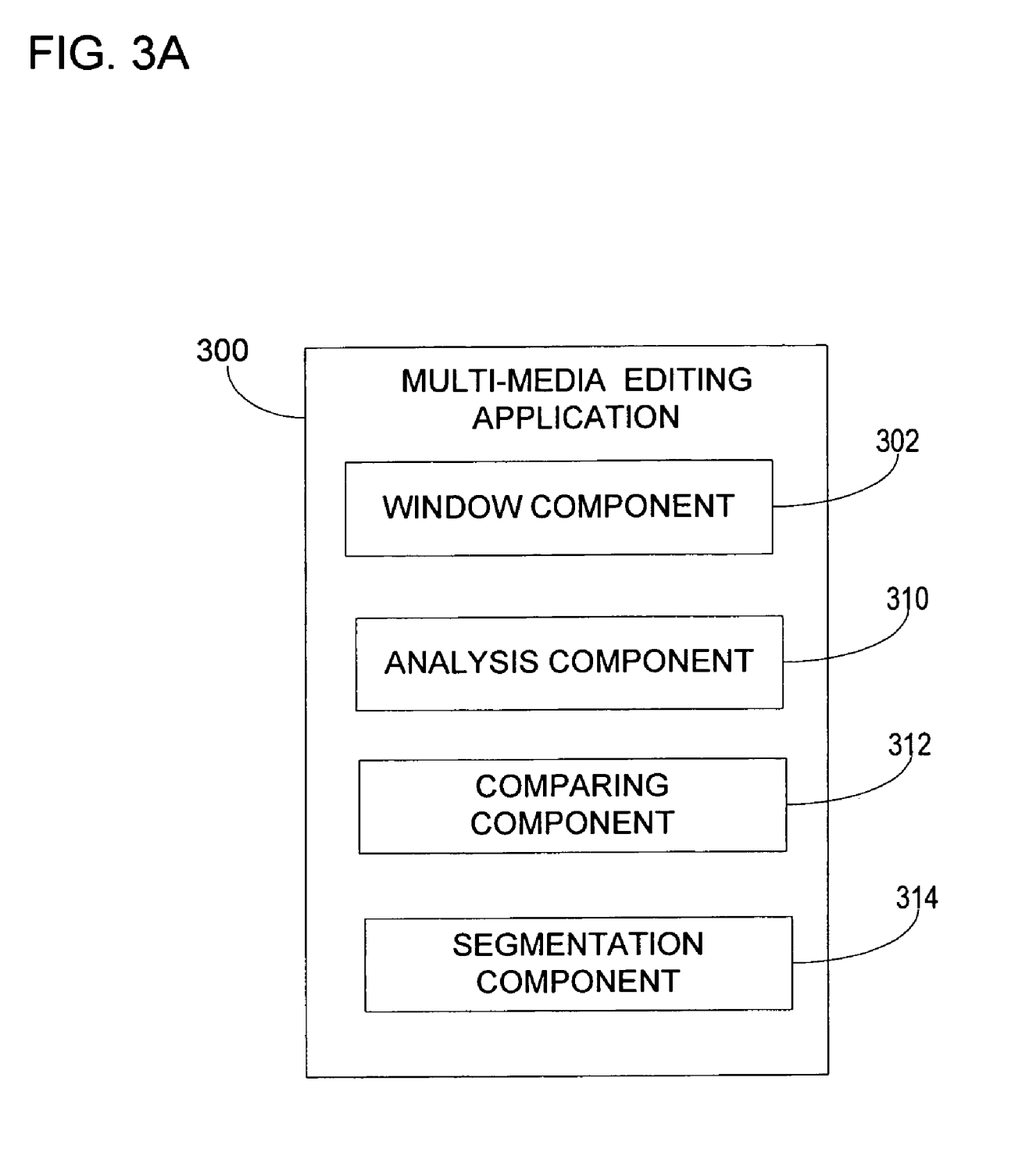
FIG. 3A is an exemplary block diagram illustrating components of an MEA for implementing the invention.

Referring now to FIG. 3A, an exemplary block diagram illustrates basic components of an MEA 300 for implementing aspects of the invention. A window component 302 defines a number of consecutive video frames 108 within a video file 102 to analyze for a shot, or segment, boundary in response to user input. For example, after the MEA 300 is executed, a UI 308 (e.g., UI 220 such as described in FIG. 2) prompts the user to enter, or select, a number of video frames 108 to analyze for a segment boundary. Alternatively, the MEA 300 may include a default number of consecutive video frames 108 to analyze for a segment boundary. The window component 302 is responsive to the defined number (or default number) of video frames 108 to define an analysis window. Thus, the analysis window defines the number of consecutive video frames 108 that are compared against each other to identify the video segment boundary.

Figure 3B:
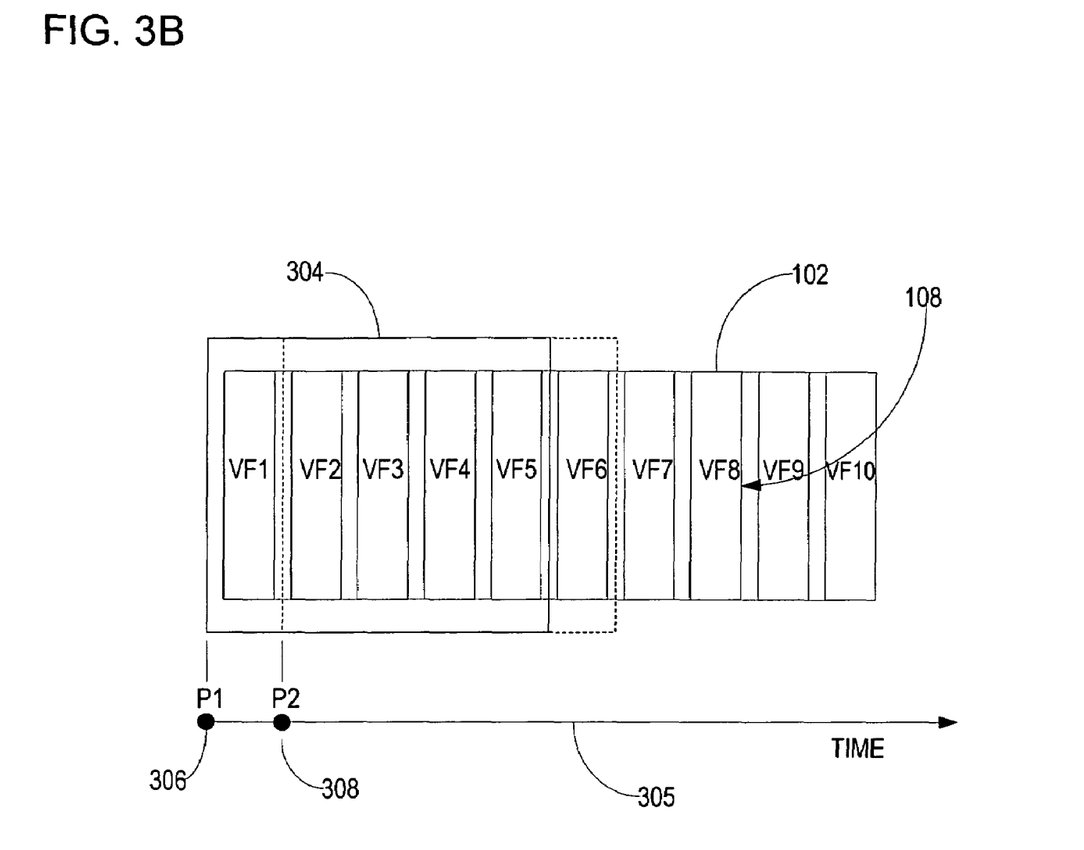
FIG. 3B is an exemplary block diagram illustrating an analysis window defining a series video frames to analyze for a segment boundary.

Referring briefly to FIG. 3B, a block diagram illustrates an exemplary analysis window 304. In this example, a particular video file 102 includes 10 video frames 108 (e.g., VF1-VF10), and the analysis window 304 is defined to analyze five (5) consecutive video frames 108 for a segment boundary. Notably, the analysis window 304 is a sliding window. That is, after the initial set of consecutive video frames have been analyzed, as described in more detail below, to identify a segment boundary, the analysis window 304 is repositioned along the time line 305 to define a next set of consecutive video frames 108 in the video file 102 to analyze for a segment boundary. For example, as shown in FIG. 3B, after a first set of video frames 108 (e.g., VF1-VF5) have been analyzed, the left edge of the analysis window 304 advances from a first position P1, as indicated by 306, to a second position P2, as indicated by 308, to define a next set of video frames 108 (e.g., VF2-VF6) to analyze for a segment boundary.

As described above, MEAs 300 known to those skilled in the art detect shots within a captured video by analyzing the time of day recorded with each video frame 108. Alternatively, MEAs 300 detect shot boundaries by analyzing the image content of each frame of a video file 102 using color histograms or other image analysis techniques. Most existing shot detection methods that involve image analysis can be categorized as one of two methods: the frame difference method, and the sliding window method. In the frame difference method, the content of adjacent video frames 108 is each assigned a content value by using color histograms or other image analysis techniques. The difference between the frames values are then compared directly against a threshold value. Unfortunately, as known to those skilled in the art, no single existing threshold value can be used to achieve a desired level of performance in both precision and recall for a wide range of videos. The second method involves comparing the ratio between the local maximum frame differences within a sliding window 304 against a threshold value. Although, the second method is usually better in achieving a balanced performance in precision and recall, the possibility exists that visually significant boundaries may be missed if there are two or more strong candidates near to a real boundary.

Referring back to FIG. 3A, an analysis component 310 analyzes video frames 108 within the defined analysis window 304 to identify a segment boundary. The analysis component 310 determines a content property value for each of the video frames 108 within the analysis window 304 by computing, for example, a Hue, Saturation, and Value (HSV) color histogram for each video frame 108 in the window 304. Notably, although aspects of the invention are described herein as determining a content value of a video frame by using HSV color histogram analysis, it is contemplated that color space histograms such as RGB color histogram analysis and YUV color histogram analysis, as well as any other digital signal processing technique can be used. As known to those skilled in the art, color histograms can be used to determine a content value of a digital image. A color histogram of an image represents the distribution of its pixels in the color space. The histogram is a graph showing the number of pixels in an image at each different color value, or bin, in the color space. For example, a HSV color histogram which has been quantized into k bins for H, l bins for S and m bins for V can be represented as $HSV_{klm}$. A color histogram is constructed by counting pixels belonging to each color bin. A segment boundary in a video can be determined by comparing the distance or difference between the color histogrames of adjacent frames.

The analysis component 310 calculates differences in property values (e.g., color histograms) between adjacent video frames 108 within the defined analysis window 304 to determine a maximum difference of the calculated differences of the property values. (e.g., greatest difference in color histograms). The analysis component 310 determines a second maximum difference of the calculated differences of the property values (i.e., next greatest difference in color histograms). The analysis component 310 then determines a mean of the differences of the property values between adjacent video frames 108, and a ratio of the maximum difference to the determined mean, and the ratio of the maximum difference to the second maximum difference.

A comparing component 312 compares the maximum difference in the analysis window 304 to a threshold minimum value stored in a memory (e.g. memory 222) of the MEA (e.g., 0.2). If the maximum difference is greater than the threshold minimum value, the comparing component 312 compares the ratio of the maximum difference to the second maximum to an adaptive threshold value stored in memory (e.g., 2.0). If the ratio of the maximum difference to the second maximum difference is greater than the adaptive threshold value, a segmentation component 314 defines a segment boundary between the two adjacent video frames 108 having the maximum difference in property values. On the other hand, if the ratio of the maximum difference to the second maximum difference is less than the adaptive threshold value, the comparing component 512 further compares the maximum difference to a threshold median value (e.g., 0.5). If the maximum difference is greater than the threshold median value, the comparing component 312 compares the ratio of the maximum difference to the calculated mean of the property value differences between adjacent video frames 108 to a second adaptive threshold value stored in memory (e.g., 10.0). If the ratio of the maximum difference to the calculated mean is greater than the second adaptive threshold value, the segmentation component 314 defines a segment boundary between the two adjacent video frames 108 having the maximum difference in property values.

After all the video frames 108 in the window 304 have been analyzed for segment boundaries, the window component 302 reposition the window 304, as described above in reference to FIG. 3B, such that the analysis window 304 defines a next set of consecutive video frames 108 to analyze for a segment boundary. The window component 302 continues repositioning (i.e., sliding) the window 304 to different positions along the time line 305 until all the video frames 108 in the video file 102 have been analyzed for segment boundaries.

The segmenting component 306 is responsive to the defined segment boundary to segment the video file 102 into segments, or shots. For example, referring again to FIG. 3B, if a segment boundary is identified between the fifth and sixth frames of the video file 102 consisting of ten video (VF1-VF10) frames, the video file is segmented into a first shot consisting of video frames VF1, VF2, VF3, VF4, and VF5, and a second shot consisting of video frames VF6, VF7, VF8, VF9, and VF10. The segmented shots can be saved as video files (each consisting of one video shot) on the hard drive of the computer or as chapters on a storage medium such as a DVD. Notably, the threshold minimum, the threshold mean, the adaptive threshold, and the second adaptive threshold value can be empirical values that have been determined from experience to correspond to a segment boundary.

Figure 4:
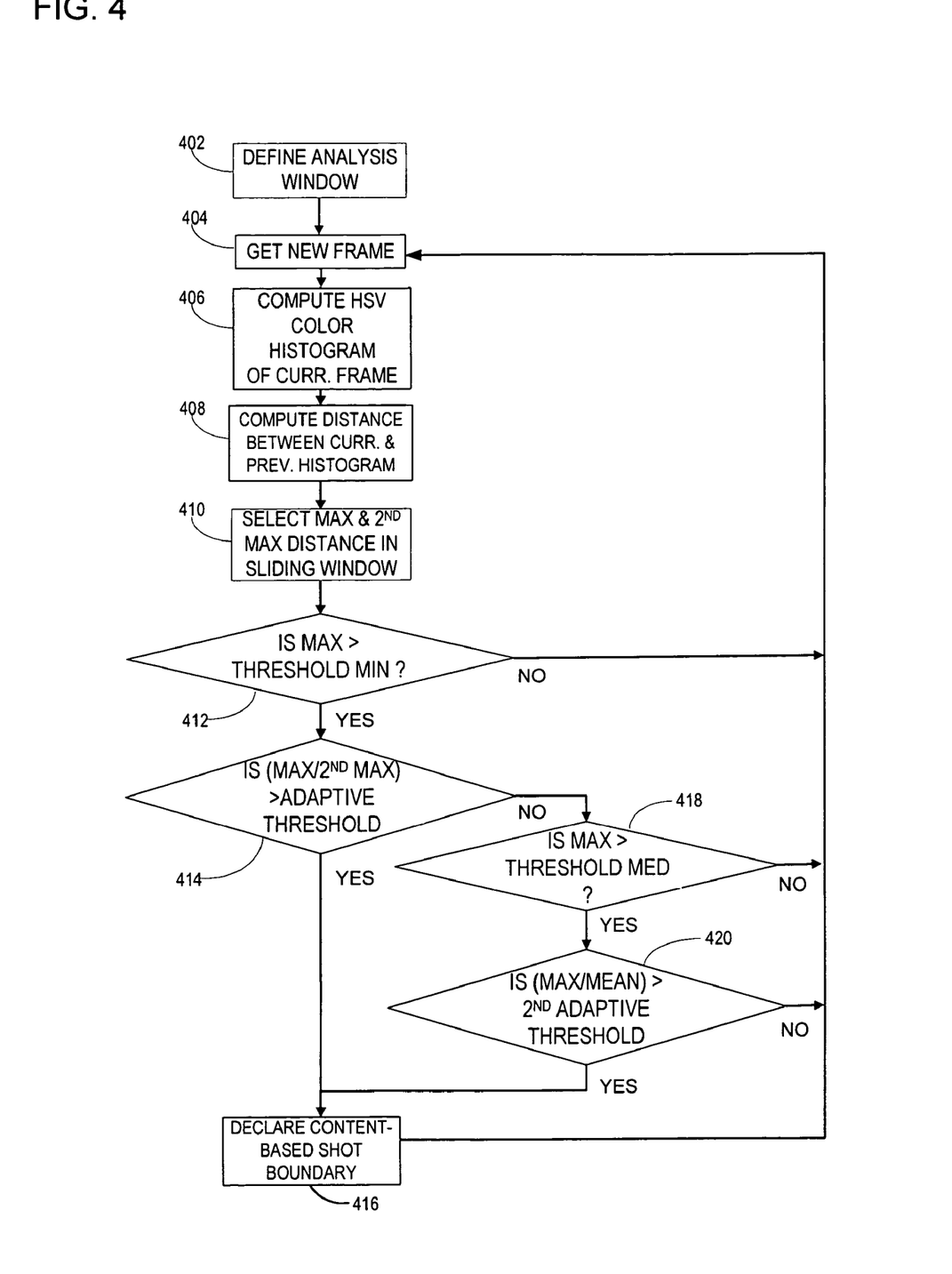
FIG. 4 is an exemplary flow chart illustrating a method for detecting one or more segment boundaries in a video.

Referring now to FIG. 4, an exemplary flow chart illustrates a method of detecting one or more segment boundaries in a video file 102 via a multimedia editing application (MEA) such as described above in referenced to FIG. 2. In response to user input, the MEA 204 defines an analysis window identifying a series of consecutive video frames within a video file to analyze for a segment boundary at 402. At 404, the MEA 204 selects a new, or first, video frame in the identified series of video frames for property analysis. The MEA 204 computes a color histogram for the selected video frame to determine a property value of the selected video frame at 406. At 408, the MEA 204 compares the results of the computed color histogram of the currently selected video frame to the computed color histogram of a previously selected adjacent video frame, and, thereby determines a difference of the property values between the adjacent video frames. The MEA 204 determines a maximum difference (i.e., the greatest difference) of the differences of the property values between adjacent video frames, and a second maximum (the next greatest difference) of the differences of the property values between adjacent video frames at 410. At 412, the MEA 204 compares the maximum difference to a threshold minimum value. If the maximum difference is less than or equal to the threshold minimum value at 412, the MEA 204 selects a new video frame from the series of video frames for property analysis at 404. If the maximum difference is greater than the threshold minimum value at 412, the MEA 204 compares a ratio of the maximum difference to the second maximum difference to an adaptive threshold value stored in memory at 414. If the ratio of the maximum difference to the second maximum difference is greater than the adaptive threshold value at 414, the MEA 204 defines a segment boundary between the two adjacent video frames having the maximum difference in property values at 416. Alternatively, if the ratio of the maximum difference to the second maximum difference is less than or equal to the adaptive threshold value at 414, the MEA 204 compares the maximum difference to a threshold median value at 418. If the maximum difference is less than or equal to the threshold median value at 418, the MEA 204 selects a new video frame from the series of video frames for property analysis at 404. If the maximum difference is greater than to the threshold median value at 418, the MEA 204 compares the ratio of the maximum difference to the calculated mean of the property value differences between adjacent video frames to a second adaptive threshold value at a 420. If the ratio of the maximum difference to the calculated mean is greater than the second adaptive threshold value at 420, the MEA 204 defines a segment boundary between the two adjacent video frames having the maximum difference in property values at 416. If the ratio of the maximum difference to the calculated mean is less than or equal to the second adaptive threshold value at 420, the MEA 204 selects a new video frame from the series of video frames for property analysis at 404.

When introducing elements of the present invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that aspects of the invention are achieved and other advantageous results attained.

As various changes could be made in the above constructions and methods without departing from the scope of embodiments of the invention, it is intended that all matter contained in the above description and shown in the accompanying drawings shall be interpreted as illustrative and not in a limiting sense.

The invention claimed is:

1. A computerized method of automatically detecting one or more segment boundaries in a video, said video including a plurality of video frames, said method comprising:
    selecting a series of video frames in the video for detection;
    determining a property value of each of the video frames in the selected series of video frames, wherein the property value of each of the video frames is determined independent of the property value of the other video frames;
    determining differences of the property values between adjacent video frames of the selected series of video frames;
    determining a maximum difference of the differences of the property values between adjacent video frames of the selected series of video frames;
    determining a mean of the differences of the property values between adjacent video frames of the selected series of video frames;
    determining a ratio of the maximum difference to the determined mean;
    comparing the maximum difference to a threshold median value and comparing the determined ratio to an adaptive threshold value; and
    defining a segment boundary as a function of the comparisons.

2. The method of claim 1, wherein selecting a series of video frames includes defining a number of consecutive video frames based on input received from a user.

3. The method of claim 1, wherein selecting a series of video frames includes defining a number of consecutive video frames to analyze for a segment boundary based on a default window size.

4. The method of claim 1, wherein determining a property value of each of the video frames in the selected series of video frames includes computing a color histogram for each video frame.

5. The method of claim 1, wherein the threshold median value and the adaptive threshold value are predefined and stored in a memory.

6. The method of claim 1, wherein defining a segment boundary as a function of the comparisons includes defining a segment boundary between the adjacent frames having the maximum difference when the maximum difference is greater than the threshold median value and the determined ratio is greater than the adaptive threshold value.

7. The method of claim 6 further comprising segmenting the video at the defined segment boundary into video shots.

8. The method of claim 1 further comprising selecting a next series of video frames of the video to analyze for one or more segment boundaries when the maximum difference is less than or equal to the threshold median value, or the determined ratio is less than or equal to the adaptive threshold value.

9. The method of claim 1 further including:
determining a next maximum difference of the differences of the property values;
determining another ratio of the maximum difference to the next maximum difference;
comparing the determined other ratio to another adaptive threshold value and comparing the maximum difference to a threshold minimum value; and
wherein defining a segment boundary as a function of the comparisons includes defining a segment boundary between the adjacent frames having the maximum difference when the maximum difference is greater than the threshold minimum value, and the determined ratio is greater than the other adaptive threshold value.

10. A computer-readable storage medium having computer-executable instructions for defining one or more segment boundaries in a video, said video including a series of video frames, said computer-readable storage medium comprising:
a user interface window component for selecting a series of video frames in the video;
an analysis component for:
determining a property value of each of the video frames in the selected series of video frames, wherein the property value of each of the video frames is determined independent of the property value of the other video frames;
determining differences of the property values between adjacent video frames of the selected series of video frames;
determining a maximum difference of the differences of the property values between adjacent video frames of the selected series of video frames;
determining a mean of the differences of the property values between adjacent video frames of the selected series of video frames; and
determining a ratio of the maximum difference to the determined mean;
a comparison component for comparing the maximum difference to a threshold median value and comparing the determined ratio to an adaptive threshold value; and
a segmentation component for defining a segment boundary as a function of the comparisons.

11. The computer-readable storage medium of claim 10, wherein the window component is responsive to user input to selectively identify a number of consecutive video frames in the video to analyze for a segment boundary.

12. The computer-readable storage medium of claim 10, wherein the analysis component determines a property value of each of the video frames in the selected series of video frames by computing a color histogram for each video frame.

13. The computer-readable storage medium of claim 10, wherein the threshold median value and the adaptive threshold value are predefined and stored in a memory.

14. The computer-readable storage medium of claim 10, wherein the segmentation component defines a segment boundary between the adjacent frames having the maximum difference when the maximum difference is greater than the threshold median value and the determined ratio is greater than the adaptive threshold value.

15. The computer-readable storage medium of claim 10, wherein the segmentation component segments the video at the defined segment boundary.

16. The computer-readable storage medium of claim 10, wherein the window component selectively identifies a next series of video frames of the video to analyze for one or more segment boundaries when the maximum difference is less than or equal to the threshold median value, or the determined ratio is less than or equal to the adaptive threshold value.

17. The computer-readable storage medium of claim 10, wherein the analysis component further determines a next maximum difference of the differences of the property values and determines another ratio of the maximum difference to the next maximum difference, and wherein the comparison component compares the maximum difference to a threshold minimum value and compares the determined other ratio to another adaptive threshold value, and wherein the segmentation component defines a segment boundary between the adjacent frames having the maximum difference when the maximum difference is greater than the threshold minimum value, and the determined ratio is greater than the other adaptive threshold value.

18. A system for processing a video, said system comprising:
a computer-readable storage medium storing a video captured from a video source, said video including a plurality of video frames;
a processor executing computer executable instructions for:
determining a property value of each of the video frames in a selected series of video frames, wherein determining a property value of each of the video frames in the selected series of video frames includes computing a color histogram for each video frame independent of the color histogram of the other video frames;
determining differences of the property values between adjacent video frames of the selected series of video frames;
determining a maximum difference of the differences of the property values between adjacent video frames of the selected series of video frames;
determining a mean of the differences of the property values between adjacent video frames of the selected series of video frames;
determining a ratio of the maximum difference to the determined mean;
comparing the maximum difference to a threshold median value and comparing the determined ratio to an adaptive threshold value;
defining a segment boundary as a function of the comparisons;
segmenting the video at the defined segment boundary into video shots; and
storing the segmented video shots on the computer-readable storage medium;
wherein the processer is responsive to the received selection to analyze the series of video frames to detect one or more segment boundaries; and
a user interface for receiving a selection of a series of video frames for analysis from a user.

* * * * *

UNITED STATES PATENT AND TRADEMARK OFFICE
CERTIFICATE OF CORRECTION

PATENT NO.       : 7,639,873 B2                                          Page 1 of 1
APPLICATION NO.  : 11/192216
DATED            : December 29, 2009
INVENTOR(S)      : Richard J. Qian It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 941 days.

Signed and Sealed this

Ninth Day of November, 2010

David J. Kappos
*Director of the United States Patent and Trademark Office*